（12）United States Patent
Kappenstein et al.

(10) Patent No.: US 10,589,331 B2
(45) Date of Patent: Mar. 17, 2020

(54) METHOD AND DEVICE FOR SEPARATING WOUND TUBES HAVING WELDED PARTS

(71) Applicant: Witzenmann GmbH, Pforzheim (DE)

(72) Inventors: Torsten Kappenstein, Pfrozheim (DE); Gerald Kolbe, Pforzheim (DE); Stefan Schnell, Stuttgart (DE)

(73) Assignee: Witzenmann GmbH, Pforzheim (DE)

( * ) Notice: Subject to any disclaimer, the term of this patent is extended or adjusted under 35 U.S.C. 154(b) by 1181 days.

(21) Appl. No.: 14/419,783

(22) PCT Filed: Jun. 7, 2013

(86) PCT No.: PCT/EP2013/061821
§ 371 (c)(1),
(2) Date: Feb. 5, 2015

(87) PCT Pub. No.: WO2014/023452
PCT Pub. Date: Feb. 13, 2014

(65) Prior Publication Data
US 2015/0217352 A1 Aug. 6, 2015

(30) Foreign Application Priority Data

Aug. 8, 2012 (DE) .......................... 10 2012 214 044

(51) Int. Cl.
*B21C 37/12* (2006.01)
*B23K 26/38* (2014.01)
(Continued)

(52) U.S. Cl.
CPC .......... *B21C 37/122* (2013.01); *B21C 37/127* (2013.01); *B23K 26/282* (2015.10);
(Continued)

(58) Field of Classification Search
CPC .... B23K 26/032; B23K 26/38; B23K 31/027; B23K 26/282; B23K 2201/06
(Continued)

(56) References Cited

U.S. PATENT DOCUMENTS 3,073,944 A * 1/1963 Yuter ..................... B21C 37/126
219/62
4,570,055 A * 2/1986 McMills ............. B29C 61/0625
156/380.2
(Continued)

FOREIGN PATENT DOCUMENTS

DE 19851173 5/2000
DE 202006003138 11/2006
(Continued)

OTHER PUBLICATIONS

Translation EP 0674964 (Year: 2019).*

*Primary Examiner* — Ibrahime A Abraham
*Assistant Examiner* — Frederick F Calvetti
(74) *Attorney, Agent, or Firm* — Volpe and Koenig, P.C.

(57) ABSTRACT

A method and a device for separating a wound tube (1) which includes interlocking windings (11, 12, 13, 14) of a metal strip (2) are provided, the wound tube (1) is welded in a predetermined axial region (10) and is then severed within the region (10) in a radial plane (6). The method furthermore defines that the wound tube (1) is axially compressed in the predetermined region prior to welding, such that the windings (11, 12, 13, 14) bear against one another in the region (10), and the welding is carried out along a predetermined number of turns (11, 12) in the region (10).

14 Claims, 1 Drawing Sheet

(51) Int. Cl.
*B23K 26/282* (2014.01)
*B23K 31/02* (2006.01)
*F16L 11/16* (2006.01)
*B23K 101/06* (2006.01)

(52) U.S. Cl.
CPC ............ *B23K 26/38* (2013.01); *B23K 31/027* (2013.01); *F16L 11/16* (2013.01); *B23K 2101/06* (2018.08)

(58) Field of Classification Search
USPC ............ 219/121.63, 121.64, 121.67, 121.72, 219/121.77, 121.83
See application file for complete search history.

(56) References Cited

U.S. PATENT DOCUMENTS

| | | | | |
|---|---|---|---|---|
| 4,840,303 A * | 6/1989 | Fujii | ................... | B23K 26/26 219/121.63 |
| 5,226,596 A * | 7/1993 | Okamura | ............ | B29C 45/2737 219/421 |
| 6,125,889 A * | 10/2000 | Elsasser | ............. | F01N 13/1816 138/118 |
| 6,380,509 B1 * | 4/2002 | Arlt | ........................ | B23K 26/28 219/121.63 |
| 6,508,277 B1 * | 1/2003 | Imes | ...................... | F16L 11/16 138/109 |
| 7,111,770 B2 * | 9/2006 | Kern | .................... | B23K 11/065 228/143 |
| 7,248,940 B2 * | 7/2007 | Neumann | ............ | B23K 26/046 219/121.6 |
| 10,016,847 B2 * | 7/2018 | Farr | ....................... | B23K 26/38 |
| 2008/0012297 A1 * | 1/2008 | Heil | .................... | F01N 13/1816 285/226 |
| 2010/0206850 A1 * | 8/2010 | Keitel | .................. | B23K 9/0282 219/61 |
| 2012/0103051 A1 * | 5/2012 | Kim | ...................... | B21C 37/121 72/342.1 |
| 2012/0264596 A1 * | 10/2012 | Koga | ...................... | C04B 28/26 502/179 |

FOREIGN PATENT DOCUMENTS

| | | |
|---|---|---|
| EP | 1703187 | 9/2006 |
| EP | 2062689 | 5/2009 |

* cited by examiner

METHOD AND DEVICE FOR SEPARATING WOUND TUBES HAVING WELDED PARTS

BACKGROUND

The invention relates to a method and a device for separating wound tubes and/or cutting them to length.

Metal tubes are called wound tubes, which are formed by windings comprising a metal strip, which windings are connected to each other relatively loosely in a form-fitting fashion. Typical forms of the connection are hooked profiles (so-called LIH-liners) and crimped profiles (Agrafe-profile, so-called LIS-liner).

Wound tubes with hooked profiles are characterized in a particularly high flexibility. Wound tubes with crimped profiles are relatively stiff overall. Based on the high flexibility particularly wound tubes with a hooked profile are hard to weld, because here no defined welding geometry develops.

A particularly preferred application of the above-mentioned wound tubes is the gas conduction in the exhaust field of passenger vehicles and utility vehicles. Additional applications are e.g., protective tubes for fiberglass, telephone lines, lines of measuring devices, or alarm systems.

A particular problem is given in wound tubes in the fact that they may also unwind after being cut to length. Then their assembly is no longer possible or only possible with increased expenses, which is undesired in production.

According to prior art, the above-mentioned wound tubes are cut, e.g., using a melting cut-off saw, and subsequently the loose end is fixed via a manually placed welding spot. This is work-intensive and accordingly costly and therefore less suitable for serial production. In addition, there is the fact that particles are undesired when wound tubes are used in exhaust systems, here particles are undesired, which may however develop when cutting a wound tube with a mechanical saw. Such particles or chips can destroy filters or other downstream arranged components, particularly components for cleaning exhaust gas. Therefore, increasingly laser cutting methods are used.

For this purpose, three axially off-set laser beams are used, guided circumferentially around the tube. A first and a second beam each place a circumferential seam for fixing the material of the wound tube, with the two seams being arranged axially off-set in reference to each other.

Subsequently, the wound tube is severed between the two seams via a third laser beam. Here it has proven disadvantageous that the two seams are embodied in a relatively undefined fashion in case of wound tubes, because a wound tube exhibits, based on its general design as described above, only relatively little material and a relatively large clear space located therebetween. Here the risk is given that during the attempt of forming a laser welding seam the wound tube is here rather severed than fixed.

Additionally, in the above-mentioned method relatively large tolerances develop due to the inherent mobility of the wound tube. In the past, this has resulted in the fact that during the actual severing process via the third laser beam the previously generated seams themselves were damaged as well. Here, repeatedly an unwinding of the wound tube occurs so that the assembly is at least aggravated.

SUMMARY

The objective of the present invention is therefore to provide a method and a device for severing wound tubes which allow a clean and reliable cutting of wound tubes.

The objective is attained in a method and a device according to the invention. Additional further developments of the invention are defined in the dependent claims.

Thus, a method is provided according to the invention for severing a wound tube, which comprises windings of a metal strip engaging each other, with the wound tube in a predetermined axial region being welded and then severed in a radial plane within a predetermined region, with the wound tube prior to the welding process being axially compressed in the predetermined region so that the windings come to rest on each other in said region, with then the welding being performed along a predetermined number of windings in the region.

By the winding tube, prior to welding, initially being compressed in the region in which it shall be severed, and then being welded along the windings, here clean cutting areas develop during the severing process and any unwinding of the tube is securely prevented. Due to the fact that the welding along the windings (preferably along a fillet or groove between the windings) rather than perpendicular in reference to the axis of the wound tube, this fillet or groove shows here a constantly narrow width, which increases the precision of this cut-off process.

Advantageously the predetermined number is greater or equivalent 2, preferably the predetermined number is precisely 2.

The welding occurs advantageously as a preliminary adhesion via individual, spaced apart welding spots or as a continuous welding seam in or next to the fillet or groove formed by the windings.

Further advantageously, the welding process occurs with the use of a laser beam.

It is further advantageous for the severing process to occur with the use of a (second) laser beam. Alternatively, however in all cases, including the following one, a mechanical severing device may also be used instead of a second laser beam without here leaving the scope of the invention.

The wound tube may be moved in reference to the first laser beam and/or the second laser beam.

However, the first laser beam and/or the second laser beam may also be moved in reference to the wound tube.

It is advantageous for the first laser beam and/or the second laser beam and/or the wound tube to be automatically positioned in reference to each other, particularly with the use of a camera or another optic device.

It is further advantageous for the first laser beam and/or the second laser beam to be automatically guided to the windings to be welded with the use of geometric information regarding the winding profile of the wound tube, such as its pitch or the like.

For this purpose, the above-mentioned information can be determined with the use of a camera or another optic device and/or a touch sensor and/or from known specification data of the wound tube.

The wound tube may also be clamped at two edges of this region in order to compress it.

The invention also relates to a device for severing a wound tube, which comprises mutually engaging windings of a metal strip: first means, which are embodied to weld the wound tube in a predetermined axial region along a predetermined number of windings, and second means, which are embodied to sever the wound tube within the predetermined region in a radial plane, with furthermore third means being provided, which are embodied for the axial compression of the wound tube in a predetermined region, so that here the individual windings come to rest on each other.

It is advantageous for the first and the second means to comprise laser devices.

It is further advantageous for a fourth means to be provided, which is embodied to move the wound tube in reference to the first and/or the second means.

The fourth means can also be embodied for moving the first and/or the second means in reference to the wound tube, though.

It is further advantageous that initially a fifth means is provided, which is embodied for positioning the first means and/or the second means in reference to the wound tube.

The fifth means may particularly be embodied to guide the first means following along the windings to be welded, using information regarding the winding profile of the wound tube.

In order to determine geometric information regarding the wound tube a cameras or the like and/or a touch sensor and/or additional means may be provided, and here the latter may be embodied for accessing an electronic database in order to determine known specification data of the wound tube.

Further advantageously additional means may be provided for clamping the wound tube at two ends, in order to compress it.

The invention also provides the advantage that at the final product in a simple, potentially automatic fashion a rectangular final severing surface is yielded in the sense of a high-quality cut without this resulting in any risk for the tube to unwind. Due to the potential automation here high production numbers can be yielded when using the present invention with correspondingly low clock times and costs.

In general, laser-based severing methods can be used for the severing as well as mechanical methods (e.g., sawing). The severing via laser beams is advantageous in that here no residual particles develop and the cutting surface is clean over its entire length.

BRIEF DESCRIPTION OF THE DRAWINGS

Additional features and advantages of the present invention are discernible from the following description of exemplary embodiments based on the drawing; shown are.

DETAILED DESCRIPTION OF THE PREFERRED EMBODIMENTS

Figure 1:
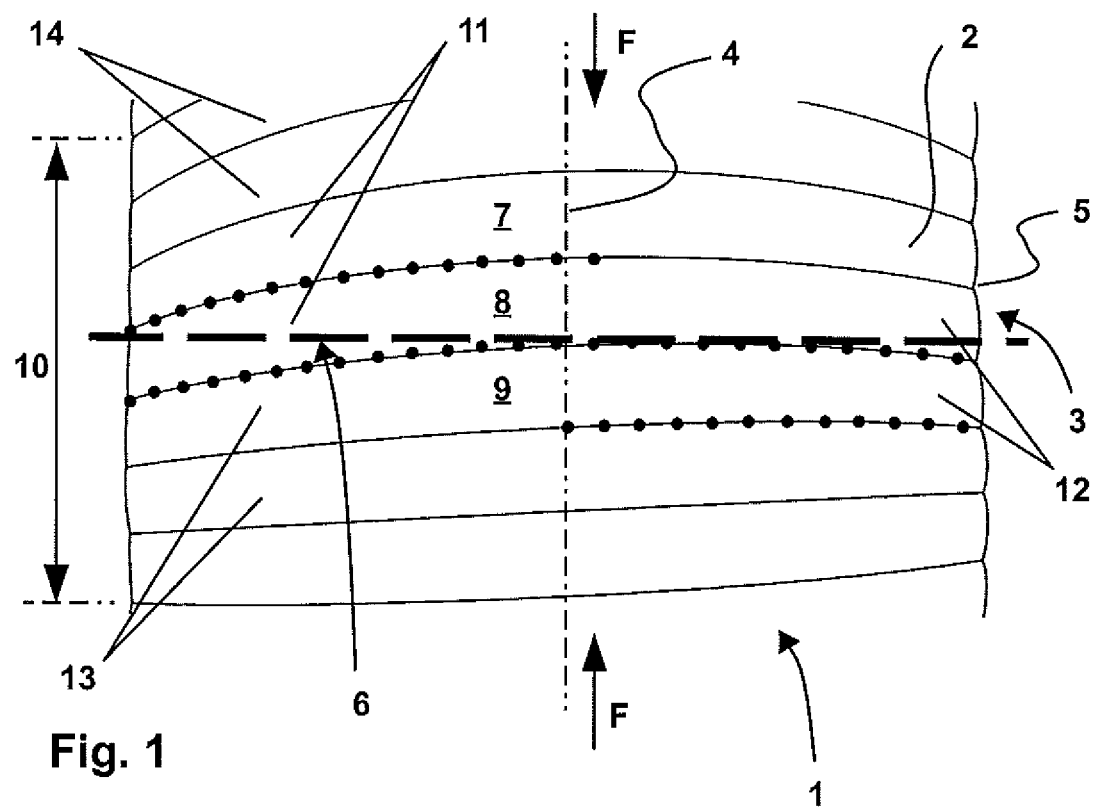
FIG. 1 the use of the method according to the invention based on the example of a wound tube with a hooked profile (LIH-liner)

FIG. 1 shows the use of the method according to the invention based on the example of a wound tube 1, with its casing 3 being formed by a spirally wound metal strip 2. In the following, a single complete rotation of the metal strip 2 about the axis 4 of the wound tube 1 is called a winding. FIG. 1 shows the windings 11, 12, 13, 14, and 15. Here, the first winding 11 (virtually) begins at the point 7 and ends at the point 8. The second winding 12 begins at the point 8 and ends at the point 9, etc. The metal strip 2 and/or the windings define a fillet 5 (in the present case also called groove), which also extends spirally on and/or in the casing 3. The connection of the metal strip 2 at its edges is realized by a loose interlocking of the neighboring windings with each other (so-called LIH-liner). Due to the fact that the connection is relatively loosely, the groove 5 is variable in its width over the casing 2.

For severing the wound tube 1 to a desired length, according to the invention the wound tube 1 is clamped at both sides of the axial point 6 at which the severing shall occur. Then the axial region 10 between the points, at which the wound tube 1 is clamped, is impinged with an axially acting force F and compressed "to block" so that in this region 10 a defined contacting of the individual windings 11, 12, 13, 14 with each other occurs, resulting in the helically extending groove 5 to be minimal and constant with regards to its width and subsequently it can be easily welded with good quality.

A welding laser is appropriately positioned for the welding process, namely manually or preferably automatically, for example with the use of a camera or the like. Then, following the pitch of the helical groove 5 in the compressed region 10 of the wound tube 1, the laser follows this path and here welds it (temporarily). Here a relative motion occurs between the wound tube and the laser. Thus, either the tube can be moved in reference to the stationary laser or the laser can be moved in reference to the stationary wound tube. Of course, both the laser as well as the wound tube 1 may be moved.

Due to the fact that the tubular geometry is known, a theoretic angle of the pitch can be assumed for the relative motion of the wound tube and the laser and considered by the control technology. The data of the wound tube 1 can respectively be obtained from an electronically saved database. It is also possible to detect the progression of the groove 5 via a camera or the like, optically or via tactile sensors, in order to ensure that the welding seam precisely develops in the groove ("in the fillet"), as shown in FIG. 1.

It has shown particularly beneficial and sufficient to weld the groove 5 over two windings 11, 12, and to sever the wound tube 1 in the middle 6 of the two windings 11, 12 (in reference to the axial direction). Then a sufficiently long region 10 develops with a precisely defined and homogenous groove 5, and a clean subsequent severing is possible without any projecting ends. At both ends of the severing line securely fixed tubular ends remain, which cannot unwind.

The welding of the two windings 11, 12 is advantageously performed via two laser beams, arranged axially off-set in reference to each other, so that every laser beam only travels on the length of one winding 11 and/or 12 and welds, which speeds up the processing.

Based on the compression of the wound tube 1 that has occurred, it results that relatively much material is available for the welding process in the groove 5 in the region 10. This relates particularly to the hooked profile; the crimped profile (Agrafe profile) cannot be completely nested, for geometric reasons. However, the above-mentioned effect still develops here, as well.

Finally, the wound tube 1 is severed at the predetermined point in the radial plane extending through the center 6 (thus perpendicular in reference to the casing 3 and also perpendicular in reference to the axis 4 of the wound tube 1). The severing occurs advantageously via a laser. Advantageously a second laser beam is used for this purpose. However, the scope of the invention also includes using the very same laser or laser beam (with an appropriate adjustment of the power) first for welding together the windings and subsequently for severing the tube.

With regards to the type of welding seam, this may be embodied as a punctual connection, as already mentioned, or also as a continuous welding seam.

Figure 2:
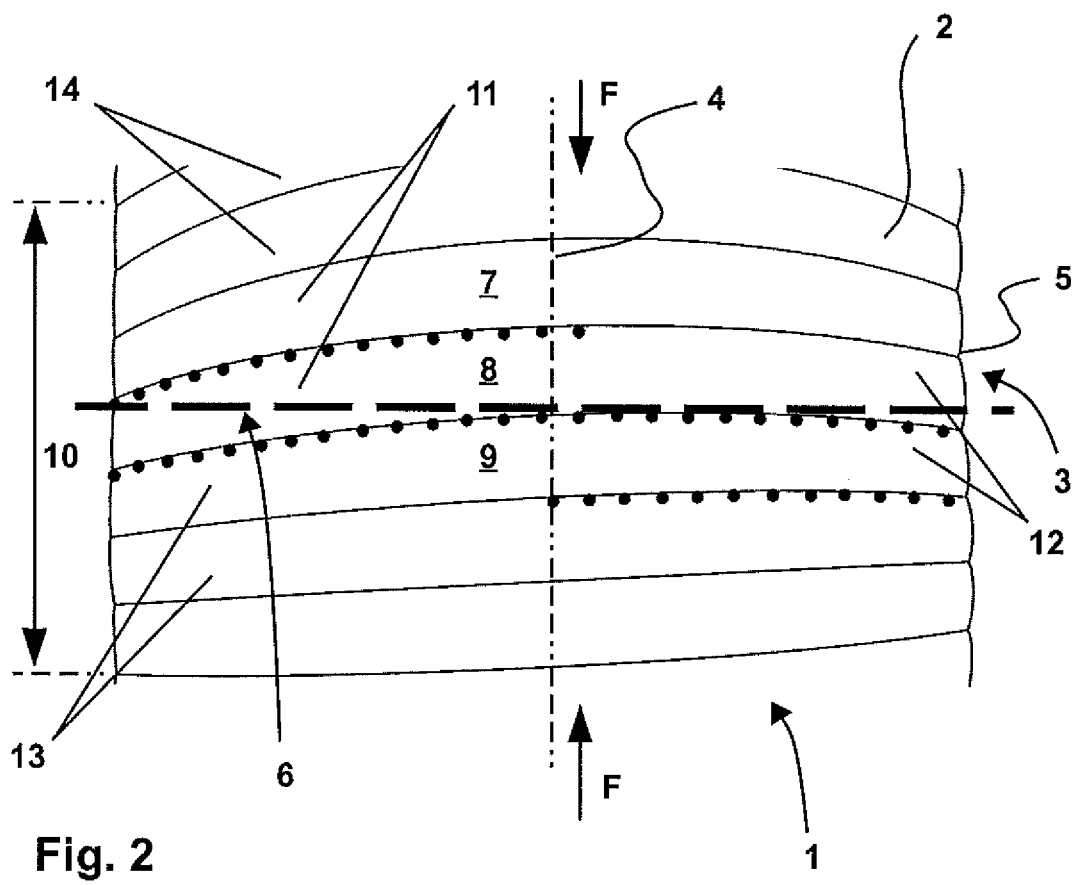
FIG. 2 the use of the method according to the invention based on the example of a wound tube with a crimped profile (Agrafe-profile, so-called LIS-liner).

FIG. 2 shows the use of the method according to the invention based on the example of a winding tube 1 with a crimped profile (Agrafe-profile, so-called US-liner). The method is similar to the one described in connection with FIG. 1, with the difference here being the fact that the welding variant "next to the flute" was used.

The device according to the invention for severing a wound tube according to the method described here is equipped as follows. Means are provided for welding the wound tube in a predetermined axial region along a predetermined number of windings. These means include preferably two lasers. These lasers are arranged axially off set from each other (in reference to the wound tube to be severed), namely by the difference of one convolution of one winding of the wound tube 1 to be severed. However the scope of the invention also includes using only one laser, which then welds successively preferably two windings of the wound tube 1 to each other, after they had been compressed to block.

Further, means are provided for severing the wound tube within the predetermined region in a radial plane. These means include another laser device, which may represent the same laser device which was used for welding the windings. Here, clamping means are provided for the axial compression of the wound tube in the above-mentioned region, which engage this wound tube and compress it "to block" such that in this region the individual windings come to contact each other.

Furthermore, means are provided for moving the wound tube in reference to the welding means. Alternatively these means may also be embodied such that they move the welding means in reference to the wound tube.

Furthermore, other means are provided which are embodied for positioning the welding means in reference to the wound tube. These means serve to find the starting position on the wound tube, from which point on the welding of the groove is being performed. The means may comprise one or more cameras or the like, which provide images of the wound tube to an evaluation and control unit, which controls and monitors the function of the entire equipment.

The cameras may support the guidance of the welding means along the groove to be welded. From the images of the camera then information is determined regarding the progression of the groove on the circumference of the wound tube. If necessary, information may also be determined regarding the type of connection, thus the winding profile.

Alternatively or additionally, here tactile sensors may also be provided by which the progression of the groove is scanned. These sensors may also forward the determined data to the evaluation and control unit.

Also alternatively or additionally, the information regarding the type and progression of the groove may be obtained by accessing an electronically saved data collection which includes the specifications of the wound tube to be severed. This data collection may be provided in the form of a database, for example provided by the manufacturer of the wound tube and accessed by the evaluation and control unit. Then the control of the welding means can occur in a purely calculated fashion, thus without any optic or mechanical scanning of the actual wound tube to be severed. The entire device acts in the manner described in connection with FIGS. 1 and 2.

LIST OF REFERENCE CHARACTERS

1 Wound tube
2 Metal strip
3 Casing
4 Axis of the wound tube
5 Fillet, groove
6 Center of the region, severing site, radial plane
7 Point (start/end of the winding)
8 Point (start/end of the winding)
9 Point (start/end of the winding)
10 Axial region of the wound tube
11 Winding
12 Winding
13 Winding
14 Winding
F Force

The invention claimed is:

1. A method for severing a wound tube (1) comprising mutually engaging windings (11, 12, 13, 14) of a metal strip (2), axially compressing the wound tube (1) to be welded in a defined axial region (10) prior to welding, welding the wound tube in the defined axial region that is axially compressed, and then severing the wound tube within the defined axial region (10) in a radial plane (6), wherein the wound tube (1) is axially compressed in the defined axial region prior to welding so that in the defined axial region (10) a contacting of the windings (11, 12, 13, 14) with each other occurs, and the welding is performed along a defined number of the windings (11, 12) in the defined axial region (10).

2. The method according to claim 1, wherein the defined number is greater than or equal to 2.

3. The method according to claim 1, wherein the welding occurs as a temporary connection or as a continuous welding seam next to a groove or fillet (5) formed in an area of the windings (11, 12, 13, 14).

4. The method according to claim 1, wherein the welding is performed with the use of a first laser beam.

5. The method according to claim 4, wherein the severing is performed with the use of a second laser beam or via a mechanical cutter.

6. The method according to claim 5, further comprising moving the wound tube (1) in reference to at least one of the first laser beam or the second laser beam.

7. The method according to claim 5, further comprising moving at least one of the first laser beam or the second laser beam in reference to the wound tube (1).

8. The method according to claim 5, further comprising positioning at least one of the first laser beam or the second laser beam or the wound tube (1) automatically in reference to each other, using an optic device.

9. The method according to claim 5, further comprising at least one of the first laser beam or the second laser beam automatically follows the windings (11, 12) to be welded using geometric information concerning a winding profile of the wound tube (1).

10. The method according to claim 9, further comprising determining the geometric information using at least one of a camera, a touch sensor, or based on specification data of the wound tube (1).

11. The method according to claim 1, further comprising clamping the wound tube at two edges of the predetermined axial region (10) in order to be compressed.

12. A wound tube (1) produced according to the method of claim 1.

13. A device for severing a wound tube (1), comprising mutually engaging windings (11, 12, 13, 14) of a metal strip (2), including:
- a laser welder configured to weld the wound tube (1) in a defined axial region (10) along a defined number of the windings (11, 12) and
- a laser or mechanical cutter that is adapted to sever the wound tube (1) within the defined axial region (10) in a radial plane (6),
- a clamp that is adapted to axially compress the wound tube (1) in the defined axial region (10) such that the windings (11, 12, 13, 14) come to contact each other in the region (10).

14. The device according to claim 13, further comprising at least one of a sensor or camera that guides the welding laser to follow in reference to the wound tube (1).

* * * * *